United States Patent [19]
Martin et al.

[11] Patent Number: 5,425,928
[45] Date of Patent: Jun. 20, 1995

[54] PROCEDURE FOR REGULATING THE QUANTITY OF A PROCESSING MEDIUM THAT IS USED TO REDUCE THE NITROGEN MONOXIDE CONTENT IN THE EXHAUST GASES GENERATED BY COMBUSTION PROCESSES

[75] Inventors: Walter J. Martin, Tegernsee; Johannes J. E. Martin, Seeshaupt, both of Germany; Stefan Hörler, Klosters, Switzerland; Thomas Nikolaus, Allensbach, Germany

[73] Assignee: Martin GmbH für Umwelt- und Energietechnik & Techform Engineering AG, Munich, Germany

[21] Appl. No.: 980,909

[22] Filed: Nov. 24, 1992

[30] Foreign Application Priority Data

Dec. 3, 1991 [DE] Germany ............... 41 39 862.9

[51] Int. Cl.6 ............................................. C01B 21/00
[52] U.S. Cl. ......................................................... 423/235
[58] Field of Search ............. 423/235, 235 D, 239, 423/239 A, 239 Y, 239.1

[56] References Cited

U.S. PATENT DOCUMENTS

| | | |
|---|---|---|
| 4,565,679 | 1/1986 | Michalak et al. ............ 423/235 |
| 5,017,347 | 5/1991 | Epperly et al. ............. 423/235 |
| 5,260,042 | 11/1993 | Martin ...................... 423/235 |

FOREIGN PATENT DOCUMENTS

| | | |
|---|---|---|
| 0263183A1 | 4/1988 | European Pat. Off. . |
| 0263195A1 | 4/1988 | European Pat. Off. . |
| 53-132466 | 11/1978 | Japan . |
| 53-132469 | 11/1978 | Japan . |
| 60-202716 | 3/1986 | Japan . |
| 2-57980 | 12/1990 | Japan . |

*Primary Examiner*—Wayne Langel
*Attorney, Agent, or Firm*—McAulay Fisher Nissen Goldberg & Kiel

[57] ABSTRACT

In a process that is used to regulate the quantity of a processing medium that is used to reduce the nitrogen monoxide content in the exhaust gases generated by combustion processes, in which the quantity that is used is regulated as a function of the nitrogen monoxide content, a processing medium blow-by nominal value (8) that is changed as a function of the nitrogen monoxide content value (3) measured in the exhaust gas (2) is used in addition to a pre-set nitrogen monoxide nominal value (7).

6 Claims, 1 Drawing Sheet

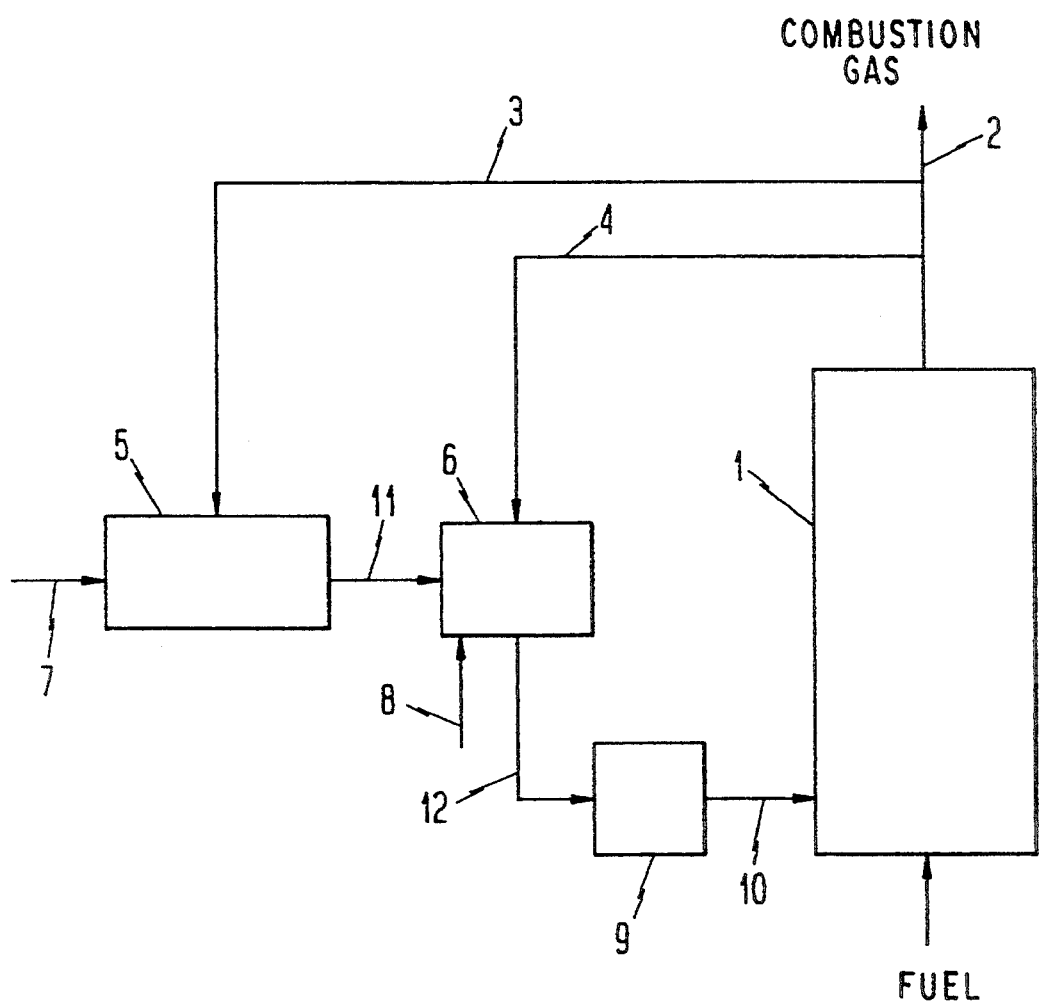

PROCEDURE FOR REGULATING THE QUANTITY OF A PROCESSING MEDIUM THAT IS USED TO REDUCE THE NITROGEN MONOXIDE CONTENT IN THE EXHAUST GASES GENERATED BY COMBUSTION PROCESSES

The present invention relates to a process for regulating the quantity of a processing medium that is used to reduce the nitrogen monoxide content in exhaust gases generated by combustion processes, in which the quantity that is used is regulated as a function of the nitrogen monoxide content.

In the treatment of exhaust gases generated by combustion processes so as to reduce the nitrogen monoxide content, either ammonia is added to the flow of exhaust gas ahead of a reduction catalyst (SCR process), or else ammonia, or a substance that forms ammonia or ammonia compounds at certain temperatures (e.g. urea, ammonium carbonate, or similar substances), is introduced into the flow of exhaust gas in the temperature range above 700° C. (SNCR process). In both cases, ammonia that is not used during the reduction reaction of the nitrogen monoxide can be carried off in the exhaust gases as a so-called ammonia blow-by or slip. This contributes both to atmospheric contamination and also affects subsequent exhaust gas scrubbers if ammonia or ammonia compounds (ammonium chloride, ammonium sulphate, ammonium bisulphate) are flushed out of the filter system with the dust or with the waste water from a wet scrubber.

It is the task of the present invention to propose a procedure for regulating the quantity of a processing medium, e.g., ammonia, that is used to reduce the nitrogen monoxide content in exhaust gases generated by combustion processes, by means of which it is possible to keep not only the nitrogen monoxide content, but also the content of unused processing medium, as low as possible.

Proceeding from a process of the type described heretofore, according to the present invention this problem has been solved in that, in addition to a prescribed nominal value for the nitrogen monoxide content, a processing medium blow-by or slip nominal value is used; this is varied as a function of the nitrogen monoxide content measured in the smoke gas. As a result of linking a nitrogen monoxide nominal value and a processing medium blow-by or slip nominal value, as provided for by the present invention, in order to regulate the quantity of processing medium that is used, the desired objective, namely the reduction of the nitrogen monoxide content is achieved while simultaneously taking the smallest possible blow-by or slip of processing medium into account. According to a preferred embodiment of the procedure, improved regulation accuracy is achieved in that when the processing medium blow-by or slip nominal value is changed, the rate of change of the nitrogen monoxide value that is measured is also taken into account.

As an example, ammonia can be used as the processing medium, in which case the ammonia that is not used during reduction of the nitrogen monoxide escapes as ammonia blow-by or slip or slip.

BRIEF DESCRIPTION OF DRAWING

The Drawing is a diagram of the process according to the present invention.

The present invention is described in greater detail below on the basis of a diagram that is shown in the drawings.

As can be seen from the drawing, in order to regulate the quantity of a processing medium that is introduced into a combustion plant 1 consisting of a combustion system and a boiler, both the content of nitrogen monoxide 3 as well as the blow-by or slip of processing medium (ammonia blow-by) 4 is measured in the exhaust gas 2, the measurement of these values being undertaken at one point where there is exhaust gas that has already been processed (i.e., to which the processing medium has already been added). The value of the nitrogen monoxide content 3 is passed to a regulator 5 as a regulating value, the value of the treatment blow-by or slip 4 is passed to a regulator 6 as a regulating value. The regulator 5 contains the nitrogen monoxide content nominal value 7 that is to be maintained, whereas the processing medium blow-by or slip nominal value 8 that is to be maintained is passed to the regulator 6. This prescribed processing medium blow-by or slip nominal value that is set the start of operations represents a base setting that is changed as the exhaust gas is being processed, as will be described below.

If processing medium 10 is now added to the exhaust gas by means of a delivery system 9, as a function of the measured nitrogen monoxide content 3, when the prescribed nitrogen monoxide content nominal value 7 is taken into account, and if the measured blow-by or slip value of the processing medium that is measured increases, for example, because of fluctuations in the combustion process, less processing medium will have to be added to the exhaust gas. However, this would lead to an increase in the nitrogen monoxide content. Were one now to regulate the quantity that is introduced only as a function of the nitrogen monoxide content, one would then have no control over the blow-by or slip of the processing medium.

According to the present invention, the value 3 of the measured nitrogen monoxide content within the exhaust gas is now used in order to generate a regulating value 11 within the regulator 5 and this leads to a change in the processing medium blow-by or slip nominal value in the regulator 6 and thus to a regulating value 12. By means of this regulating value 12, the regulator 6 acts on the supply system 9 for the processing medium 10 and thus varies the quantity of the processing medium that is to be added to the exhaust gas.

As an example, if the value 3 of the nitrogen monoxide content exceeds the prescribed nitrogen monoxide nominal value 7 by a certain amount, when in practice the value 3 is used as an average value over a specific time, for example, one minute, then the processing medium blow-by or slip nominal value 8 is increased in the regulator 6 by the regulating value 11 that is provided by the regulator 5. This means that the quantity of processing medium that is introduced is not increased to the same great extent as was the case when the quantity to be introduced was influenced exclusively as a function of the established value 3 of the nitrogen monoxide content. Regulation of the quantity to be used exclusively by the value 3 of the nitrogen monoxide content resulted in too great a rise in the processing medium blow-by or slip 4 which, in its turn, caused greater environmental pollution. As a result of the measure according to the present invention, the tendency to increase the quantity that is to be used when the nitrogen monoxide content rises is suppressed, whereby a specific equilibrium between the nitrogen monoxide content and the processing medium blow-by or slip is maintained, thus making it possible to avoid an excessive increase in the treatment medium blow-by at the cost of more precisely maintaining the nitrogen monoxide content.

The embodiments of the invention in which an exclusive right or privilege is claimed are defined as follows:

1. A process for regulating the quantity of a treatment medium that is used to reduce the nitrogen monoxide content in the exhaust gases generated by combustion processes, the quantity of the medium that is used being regulated as a function of the nitrogen monoxide content, wherein in addition to a pre-set nitrogen monoxide nominal value, a treatment medium slip nominal value is used, said treatment medium slip nominal value being varied as a function of the nitrogen monoxide content that is measured in the exhaust gas.

2. A process as defined in claim 1, wherein the rate of change of the measured nitrogen monoxide content value is taken into account when changing the treatment medium slip nominal value.

3. A process for regulating the quantity of a treatment medium supplied to exhaust gases to reduce nitrogen monoxide content, the process comprising the steps of:
   generating a first value proportional to the nitrogen monoxide content of the exhaust gases;
   generating a second value proportional to treatment medium content of the exhaust gases;
   supplying a nitrogen monoxide nominal value;
   calculating a treatment medium nominal value as a function of said first value; and
   regulating the quantity of the treatment medium supplied as a function of said nitrogen monoxide nominal value, said first value, said second value, and said treatment medium nominal value.

4. A process for regulating the quantity of a treatment medium supplied to exhaust gases to reduce nitrogen monoxide content, the process comprising the steps of:
   generating a first value proportional to the nitrogen monoxide content of the exhaust gases;
   generating a second value proportional to treatment medium content of the exhaust gases;
   supplying a nitrogen monoxide nominal value;
   calculating a treatment medium nominal value as a function of the rate of change of said first value;
   regulating the quantity of the treatment medium supplied as a function of said nitrogen monoxide nominal value, said first value, said second value, and said treatment medium nominal value.

5. A process for regulating the quantity of a treatment medium that is used to reduce the nitrogen monoxide content in the exhaust gases generated by combustion processes, the quantity of the medium that is used being regulated as a function of the nitrogen monoxide content, wherein in addition to a pre-set nitrogen monoxide nominal value, a treatment medium slip nominal value is used, said treatment medium slip nominal value being varied as a function of the nitrogen monoxide content that is measured in the exhaust gas; and
   wherein ammonia is used as the processing medium, the ammonia that is not used in the nitrogen monoxide reduction escaping as ammonia slip.

6. A process for regulating the quantity of a treatment medium that is used to reduce the nitrogen monoxide content in the exhaust gases generated by combustion processes, the quantity of the medium that is used being regulated as a function of the nitrogen monoxide content, wherein in addition to a preset nitrogen monoxide nominal value, a treatment medium slip nominal value is used, said treatment medium slip nominal value being varied as a function of the nitrogen monoxide content that is measured in the exhaust gas;
   wherein the rate of change of the measured nitrogen monoxide content value is taken into account when changing the treatment medium slip nominal value; and
   wherein ammonia is used as the processing medium, the ammonia that is not used in the nitrogen monoxide reduction escaping as ammonia slip.

* * * * *